United States Patent  (10) Patent No.: US 11,847,833 B2
Sohn et al.  (45) Date of Patent: Dec. 19, 2023

(54) BROAD COVERAGE NON-CONTACT OBSTACLE DETECTION (71) Applicant: STRATTEC SECURITY CORPORATION, Milwaukee, WI (US)

(72) Inventors: John Michael Sohn, Gross Pointe, MI (US); Ervin Colic, Troy, MI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 344 days.

(21) Appl. No.: 17/174,542

(22) Filed: Feb. 12, 2021

(65) Prior Publication Data
US 2021/0248394 A1 Aug. 12, 2021

Related U.S. Application Data (60) Provisional application No. 62/975,572, filed on Feb. 12, 2020.

(51) Int. Cl.
*G06V 20/58* (2022.01)
*B60W 50/12* (2012.01)
(Continued)

(52) U.S. Cl.
CPC .............. *G06V 20/58* (2022.01); *B60W 30/08* (2013.01); *B60W 50/12* (2013.01); *H04L 12/40* (2013.01);
(Continued)

(58) Field of Classification Search
CPC ........ G06V 20/58; G06V 20/56; G06V 40/10; G06V 10/143; G06V 20/10; G06V 40/172;
(Continued)

(56) References Cited

U.S. PATENT DOCUMENTS 6,205,710 B1    3/2001  Busse
6,304,178 B1 *  10/2001 Hayashida .............. E05F 15/43
                                            340/552

(Continued)

FOREIGN PATENT DOCUMENTS

CN    108515905 A    9/2018
CN    109306834 B    10/2020
(Continued)

OTHER PUBLICATIONS

Abdulraheem Killdeer, Texas Instruments, You Tube Video, Obstacle Detection with mm Wave Sensors, #CES2018, 3-Screenshots, Jun. 15, 2018.

(Continued)

*Primary Examiner* — Nimesh Patel
(74) *Attorney, Agent, or Firm* — Michael Best & Friedrich LLP (57) ABSTRACT

Systems and methods for detecting a potential object for a powered door of a vehicle. The system includes an electronic control unit and a noncontact sensor, the noncontact sensor having a field-of-view substantially including an obstacle detection zone defined for a powered door. The electronic control unit is configured to receive data from the noncontact sensor, determine, based on the data received from the noncontact sensor, an object located at a position within the field-of-view of the noncontact sensor, determine whether the position of the object is within the obstacle detection zone defined for the powered door, and in response to the position of the object being within the obstacle detection zone for the powered door, perform an automatic action with respect to the powered door before the powered door contacts the object.

20 Claims, 11 Drawing Sheets

(51) Int. Cl.
*H04L 12/40* (2006.01)
*B60W 30/08* (2012.01)

(52) U.S. Cl.
CPC .............. *B60W 2554/4048* (2020.02); *H04L 2012/40273* (2013.01)

(58) Field of Classification Search
CPC ...... G06V 10/44; G06V 10/507; G06V 20/80; G06V 40/23; G06V 40/28; G06V 10/764; G06V 10/82; G06V 20/52; G06V 20/53; G06V 40/16; G06V 40/165; G06V 40/20; E05F 15/73; E05F 2015/767; E05F 2015/434; E05F 2015/433; E05F 2015/483; E05F 15/70; E05F 15/00; E05F 15/41; E05F 15/42; E05F 15/77; E05F 15/443; E05F 5/025; G06T 7/248; G06T 2207/30252; G06T 1/00; G06T 7/00; G06T 13/20; G06T 13/40; G06T 7/55; G06T 7/73; G06T 9/002; E05Y 2900/531; G06F 3/011; G06F 3/017; G06F 16/50; G06F 3/04842; G06F 2203/012; G06F 3/04845; G08B 21/24; G08B 21/22; G08B 13/00; G08B 15/002; G08B 19/00; G08B 27/003; G06N 3/045; G06N 3/08; G06N 3/004; G06N 3/008; G06N 5/022; B66B 13/26; B66B 5/02; B60W 2420/52; B60W 2554/4048; B60W 30/08; B60W 50/12; E05B 81/76; E05B 81/77; E05B 83/36; E05B 79/02; E05B 81/64; E05B 81/00; E05B 81/14; E05B 85/26; B60R 25/2045; B60R 25/20; B60R 25/24; B60R 1/06; B60R 16/03; B60R 2001/1223; B60R 21/0134; B60R 2021/01006; B60R 21/0136

See application file for complete search history.

(56) References Cited

U.S. PATENT DOCUMENTS

| | | | |
|---|---|---|---|
| 7,151,350 B2 | 12/2006 | Haag et al. | |
| 8,511,739 B2 | 8/2013 | Brown et al. | |
| 9,470,034 B2 | 10/2016 | Ihlenburg et al. | |
| 9,777,518 B2 | 10/2017 | Warschat et al. | |
| 9,777,528 B2 | 10/2017 | Elie et al. | |
| 9,909,350 B2 | 3/2018 | Rai et al. | |
| 10,053,903 B2 | 8/2018 | Ette | |
| 10,183,640 B2 | 1/2019 | Rhode et al. | |
| 10,186,039 B2 | 1/2019 | Choi et al. | |
| 10,358,857 B2 | 7/2019 | Wheeler et al. | |
| 10,393,864 B2 | 8/2019 | Esmail et al. | |
| 10,429,430 B2 | 10/2019 | Wuerstlein et al. | |
| 10,443,291 B2 | 10/2019 | Kim | |
| 10,443,292 B2 | 10/2019 | Baruco et al. | |
| 10,535,264 B2 | 1/2020 | Takaki | |
| 10,563,447 B2 | 2/2020 | Gunreben et al. | |
| 10,570,656 B2 | 2/2020 | Elie et al. | |
| 10,577,851 B2 | 3/2020 | Polewarczyk et al. | |
| 10,577,852 B2 | 3/2020 | Lewis et al. | |
| 10,585,191 B2 | 3/2020 | Hirano et al. | |
| 10,662,692 B2 | 5/2020 | Brueckner et al. | |
| 10,662,697 B2 | 5/2020 | Frapsauce | |
| 10,676,979 B2 | 6/2020 | Naserian et al. | |
| 10,697,226 B2 | 6/2020 | Gussen et al. | |
| 10,704,315 B2 | 7/2020 | Hamminga et al. | |
| 10,738,524 B2 | 8/2020 | Gomez Melchor et al. | |
| 10,744,941 B2 | 8/2020 | Karas | |
| 10,745,957 B2 | 8/2020 | Elie et al. | |
| 10,754,021 B2 | 8/2020 | Baheti et al. | |
| 10,761,187 B2 | 9/2020 | Santra et al. | |
| 10,768,298 B2 | 9/2020 | Wodrich et al. | |
| 10,773,656 B2 | 9/2020 | Kataoka | |
| 10,774,571 B2 | 9/2020 | Zeabari et al. | |
| 10,775,493 B2 | 9/2020 | Santra et al. | |
| 10,827,151 B2 | 11/2020 | Stein | |
| 10,829,043 B2 | 11/2020 | Inagaki et al. | |
| 10,871,017 B2 | 12/2020 | Gregory et al. | |
| 10,876,345 B2 | 12/2020 | Banvait et al. | |
| 10,877,146 B2 | 12/2020 | Korber et al. | |
| 2001/0042989 A1 | 11/2001 | Greif | |
| 2002/0074959 A1 | 6/2002 | Van Wiemeersch | |
| 2002/0084675 A1 | 7/2002 | Buchanan, Jr. et al. | |
| 2005/0174077 A1 | 8/2005 | Haag et al. | |
| 2005/0285581 A1* | 12/2005 | Hayakawa | G01D 5/142 323/282 |
| 2007/0024431 A1 | 2/2007 | Touge | |
| 2008/0296927 A1* | 12/2008 | Gisler | E05F 15/43 296/146.4 |
| 2009/0229183 A1* | 9/2009 | Kamiya | E05F 15/43 49/28 |
| 2009/0242310 A1 | 10/2009 | Touge | |
| 2009/0243826 A1 | 10/2009 | Touge | |
| 2015/0009062 A1 | 1/2015 | Herthan | |
| 2017/0219702 A1 | 8/2017 | Matsuura et al. | |
| 2017/0242120 A1 | 8/2017 | Matsuura et al. | |
| 2017/0247926 A1 | 8/2017 | Elie et al. | |
| 2017/0268278 A1* | 9/2017 | Ichinose | B60R 25/24 |
| 2017/0268280 A1 | 9/2017 | Kim | |
| 2017/0306684 A1* | 10/2017 | Baruco | E05F 15/73 |
| 2017/0314318 A1 | 11/2017 | Hassenpflug | |
| 2017/0371032 A1 | 12/2017 | Koelsch | |
| 2018/0238099 A1 | 8/2018 | Schatz et al. | |
| 2019/0101634 A1* | 4/2019 | Baheti | G01S 13/62 |
| 2019/0268280 A1 | 8/2019 | Wang et al. | |
| 2019/0292838 A1 | 9/2019 | Tokudome | |
| 2020/0110172 A1 | 4/2020 | DeCia et al. | |
| 2020/0148108 A1* | 5/2020 | Kumashiro | E05B 77/04 |
| 2020/0157873 A1* | 5/2020 | Sabatini | E05F 15/73 |
| 2020/0284876 A1* | 9/2020 | Hurd | G01S 7/415 |
| 2021/0086760 A1 | 3/2021 | Al Nahlaoui et al. | |

FOREIGN PATENT DOCUMENTS

| | | | |
|---|---|---|---|
| CN | 111994071 A | 11/2020 | |
| CN | 109424289 B | 1/2021 | |
| DE | 102008056201 A1 | 5/2010 | |
| DE | 102011082545 A1 | 3/2013 | |
| DE | 102018204546 A1 | 9/2019 | |
| DE | 102018125985 A1 | 4/2020 | |
| DE | 102019121650 A1 | 12/2020 | |
| EP | 1693684 A1 | 8/2006 | |
| EP | 1743999 A2 | 1/2007 | |
| EP | 2478918 A2 | 7/2012 | |
| EP | 2860718 A1 | 4/2015 | |
| EP | 3215866 B1 | 4/2020 | |
| EP | 3195006 B1 | 9/2020 | |
| EP | 2009211 B1 | 10/2020 | |
| FR | 3086250 A1 | 3/2020 | |
| JP | 2004230993 A | 8/2004 | |
| JP | 2005273248 A | 10/2005 | |
| JP | 2007138457 A | 6/2007 | |
| JP | 2007138540 A | 6/2007 | |
| JP | 2007140852 A | 6/2007 | |
| JP | 2009235820 A | 10/2009 | |
| JP | 2017138761 A | 8/2017 | |
| JP | 2020085789 A | 6/2020 | |
| JP | 2020106380 A | 7/2020 | |
| KR | 20170071304 A | 6/2017 | |
| WO | WO-2011147827 A1 * | 12/2011 | ............ B60J 5/042 |
| WO | WO2016117328 A1 | 7/2016 | |
| WO | WO201729234 A1 | 2/2017 | |
| WO | WO2018001915 A1 | 1/2018 | |
| WO | WO201896808 A1 | 5/2018 | |
| WO | WO202016121 A1 | 1/2020 | |
| WO | WO202058222 A1 | 3/2020 | |
| WO | WO202079942 A | 4/2020 | |
| WO | WO202089233 A1 | 5/2020 | |
| WO | WO2020157108 A1 | 8/2020 | |

(56) References Cited

FOREIGN PATENT DOCUMENTS

| WO | WO2020161034 A1 | 8/2020 |
| WO | WO2020165323 A1 | 8/2020 |
| WO | WO2020187650 A1 | 9/2020 |

OTHER PUBLICATIONS

Texas Instruments, mm Wave radar sensors, webpage: https://training.ti.com/mmwave-training-series, Copyright 1995-2021, 3 Pages.

Texas Instruments, mm Wave radar sensors, webpage: https://www.ti.com/sensors/mmwave-radar/overview.html, Copyright 1995-2021, 4 Pages.

Texas Instruments, Robust traffic and intersection monitoring using millimeter wave sensors, webpage: https://www.ti.com/lit/wp/spyy002b/spyy002b.pdf, Copyright 2018, 13 Pages.

Texas Instruments, mm Wave Radar vs Ultrasonics, webpage: https://dev.ti.com/tirex/explore/node?node=ALFOsGLOkGLtKIso5bVDeQ_AocYeEd_LATEST, Oct. 12, 2020, 2 Pages.

\* cited by examiner

BROAD COVERAGE NON-CONTACT OBSTACLE DETECTION

RELATED APPLICATIONS

This application claims the benefit of U.S. Provisional Patent Application No. 62/975,572, filed Feb. 12, 2020, the entire content of which is hereby incorporated by reference.

FIELD OF THE INVENTION

Embodiments described herein generally relate to obstacle detection systems for a powered door system, such as a powered door on a vehicle or a building.

SUMMARY OF THE INVENTION

Many current vehicles have one or more powered door systems, such as, for example, a powered side swing door, a powered side sliding door, a powered rear liftgate, or a powered rear tailgate. Most powered door systems are also suited with obstacle detection (OD) systems. These OD systems require physical contact between the moving door and the obstacle to detect the obstacle and take evasive action. Because these OD systems require physical contact, this physical contact, depending on the obstacle and the movement of the door, may cause damage to the vehicle. Therefore, detecting obstacles only after physical contact has been made may, in some situations, not prevent damage. Furthermore, the physical contact can heighten concern of the driver and passengers as to the perception of safety of the system and, potentially, the overall vehicle.

Accordingly, embodiments described herein provide noncontact obstacle detection systems and methods that use one or more noncontact sensors. As described below, noncontact sensors are sensors that utilize a technology that does not require physical contact to perform a measurement, such as, for example sonar or radar sensors. The sensors are advantageously positioned at one or more predetermined locations on a vehicle to scan a broad (e.g., maximally broad) field-of-view (FOV) and accurately detect objects in a path of a powered door (during opening of the door, closing of the door, or both) that could potentially interfere (e.g., make contact, block, or the like) with the powered door during operation (referred to herein as "potential obstacles"). In addition, the positioning of the sensor and the nature of the chosen sensor technology (e.g., radar) permits packaging the sensor in the less harsh interior vehicle environment while the sensor can still have a FOV including the exterior of the vehicle (e.g., through a window in the door even when obscured by ice, water or dirt) without having to add more sensors to the system to expand the FOV coverage. The systems and methods described herein use data collected by the sensors to detect potential obstacles before the potential obstacles interfere with the powered door and take one or more automatic actions to mitigate or present such interference. The automated actions include, in some embodiments, issuing an alarm, slowing motion of the powered door, stopping motion of the powered door, reversing motion of the powered door, or a combination thereof. Accordingly, the systems and methods described herein integrate sensor data with data and controls associated with the powered door to detect obstacles before contact over a wide FOV with minimal false detections in various environmental and vehicle use conditions. For example, embodiments described herein use sensor technologies, such as radar, that can "see" through glass, ice, rain, and dirt and, therefore, improve the scope and dependability of the FOV without requiring additional sensors. In particular, radar sensors can cover an operational field of a moving door and, as the sensors can be positioned inside the glass, the sensors are protected from environmental conditions and allow for more vehicle styling freedom while still detecting obstacles outside of the door.

For example, one embodiment provides a powered door system. The system includes an electronic control unit and a noncontact sensor. The noncontact sensor has a field-of-view including at least a substantial portion of an obstacle detection zone defined for a powered door (e.g., based on a motion path of the powered door). The electronic control unit is configured to receive data from the noncontact sensor, determine, based on the data received from the noncontact sensor, an object located at a position within the field-of-view of the noncontact sensor, and determine whether the position of the object is within the obstacle detection zone defined for the powered door. In response to the position of the object being within the obstacle detection zone for the powered door, the electronic control unit is also configured to perform an automatic action with respect to the powered door before the powered door contacts the object.

Another embodiment provides a method of detecting a potential obstacle for a powered door system. The method includes receiving data from a noncontact sensor. The noncontact sensor has a field-of-view including at least a substantial portion of an obstacle detection zone defined for a powered door. The method also includes determining, based on the data received from the noncontact sensor, an object located at a position within the field-of-view of the noncontact sensor, determining whether the position of the object is within the obstacle detection zone defined for the powered door, and in response to the position of the object being within the obstacle detection zone for the powered door, performing an automatic action with respect to the powered door before the powered door contacts the object.

Another embodiment provides a device for detecting a potential obstacle for a powered door system. The device includes an electronic control unit. The electronic control unit is configured to receive data from a noncontact sensor, the noncontact sensor having a field-of-view including at least a substantial portion of an obstacle detection zone defined for a powered door. The electronic control unit is also configured to determine, based on the data received from the noncontact sensor, an object located at a position within the field-of-view of the noncontact sensor, and determine whether the position of the object is within the obstacle detection zone defined for the powered door. In response to the position of the object being within the obstacle detection zone for the powered door, the electronic control unit is configured to perform an automatic action with respect to the powered door before the powered door contacts the object.

Other features and aspects of the invention will become apparent by consideration of the following detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. It will be appreciated that some embodiments may be comprised of one or more generic or specialized processors (or "processing devices") that include microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and systems described herein. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and can include electrical connections or couplings, whether direct or indirect.

Figure 1A:
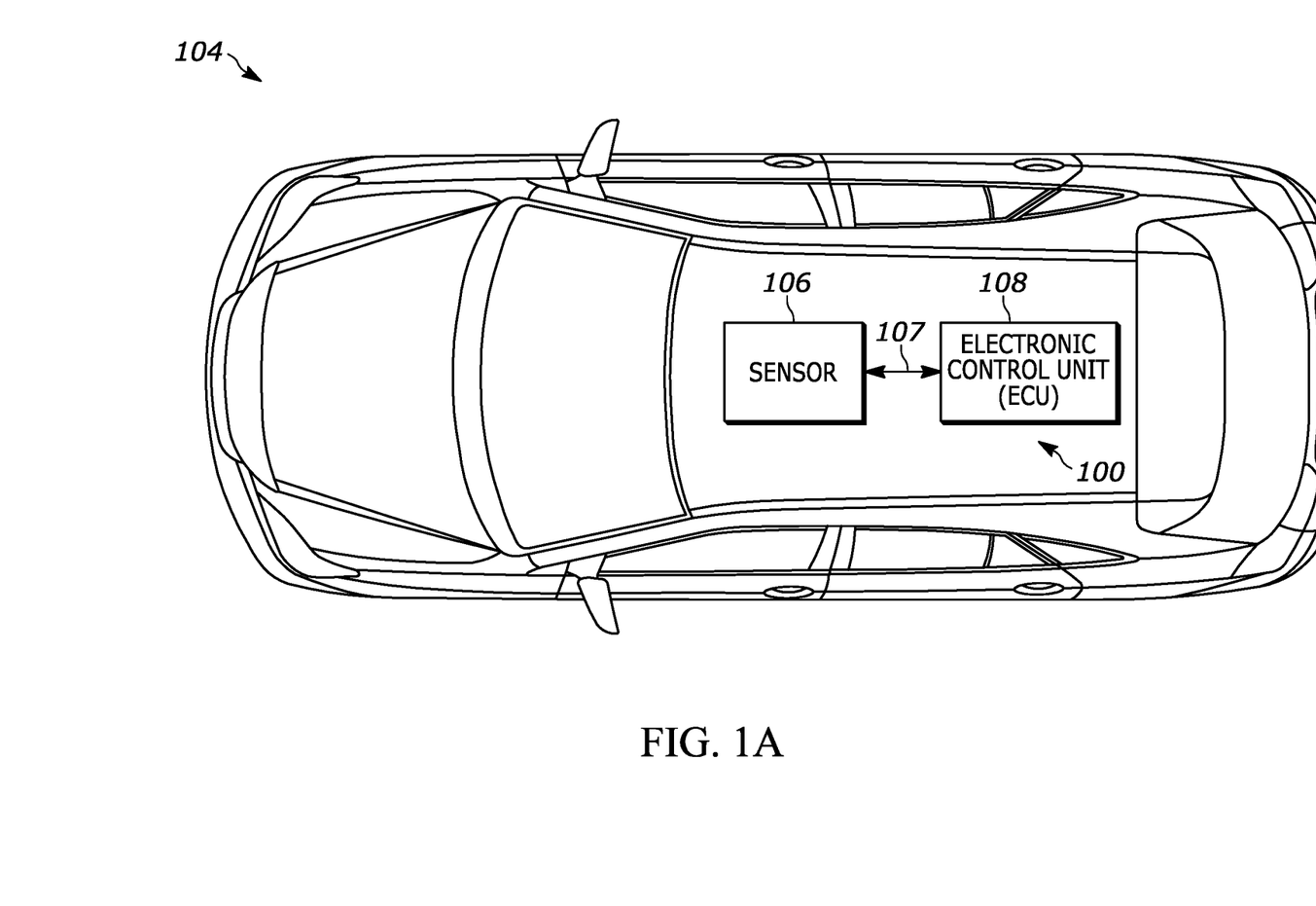
FIG. 1A is a schematic view of a system for detecting a potential obstacle for a powered door of a vehicle according to one embodiment.

FIG. 1A is a schematic view of a system 100 for detecting a potential obstacle for a powered door of a vehicle 104 according to one embodiment. As illustrated in FIG. 1A, the system 100 includes a noncontact sensor 106 and an electronic control unit (ECU) 108. As used in the present application, a "noncontact sensor" includes a sensor configured to detect a potential obstacle within a path of a moving vehicle component (e.g., a door) before the vehicle component physically contacts the potential obstacle (i.e., without requiring actual physical contact to occur between the vehicle component and the potential obstacle). For example, a noncontact sensor may be or include a radar sensor, an infrared sensor, a lidar sensor, an ultrasonic sensor, a camera, or the like. In some embodiments, the noncontact sensor 106 includes multiple sensors of the same type, of different types, or a combination thereof. The noncontact sensor 106 is described as including a radar sensor in many of the embodiments described in the present application. However, it should be understood that this is provided as an example type of noncontact sensor and other types can be used in the systems and methods described herein.

Figure 1B:
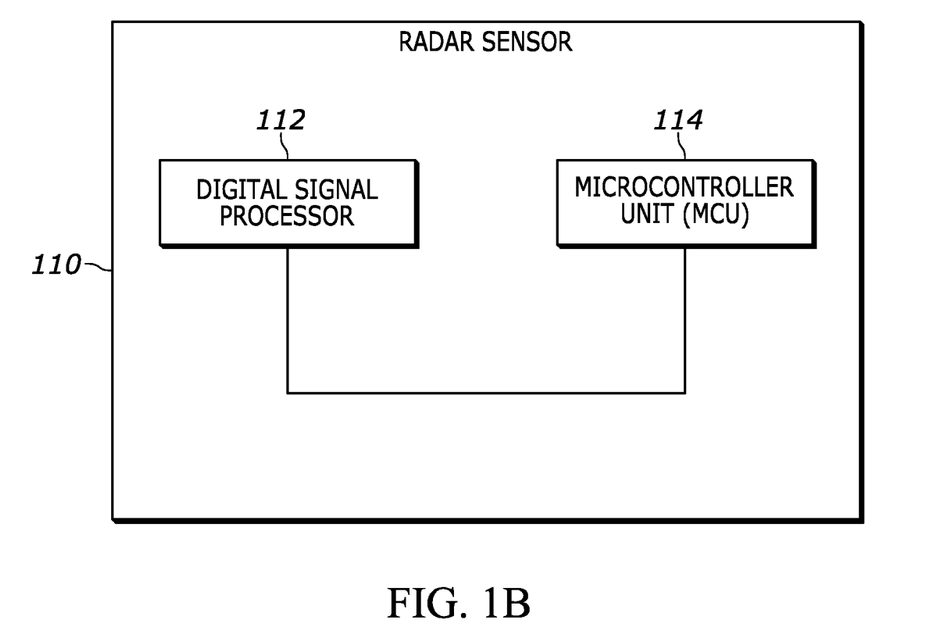
FIG. 1B is a schematic diagram illustrating a radar sensor of the system of FIG. 1A according to one embodiment.

For example, FIG. 1B schematically illustrates a radar sensor 110 that can be used with the system 100. The radar sensor 110 may be or include a millimeter wave radar sensor. For example, in some embodiments, the radar sensor 110 is or includes a single-chip 76-GHz to 81-GHz millimeter wave automotive radar sensor. The radar sensor 110 may include or be integrated with a digital signal processor (DSP) 112 and a microcontroller unit (MCU) 114. In some embodiments, the radar sensor 110 is or includes an obstacle detection sensor (ODS), not shown, for example, the AWR 1642 ODS provided by Texas Instruments Incorporated.

In some embodiments, the DSP 112 can be configured to process data collected by the radar sensor 110 (for example, ODS information), and the MCU 114 can be configured to receive processed sensor data from the DSP 112. The MCU 114 may optionally further process the received data, communicate the received data with the ECU 108, and receive data from the ECU 108. For ease of description, the terms "radar sensor" and "noncontact sensor" are used interchangeably below. However, as noted above, it should be understood that the noncontact sensor 106 may be or include sensors other than the radar sensor 110, which may include similar components as described herein with respect to the radar sensor 110 (e.g., a DSP, a MCU, and the like).

Returning to FIG. 1A, the noncontact sensor 106 (e.g., an integrated MCU) and the ECU 108 communicate wirelessly, over a wired connection, or a combination thereof. For example, in some embodiments, the noncontact sensor 106 communicates with the ECU 108 over a serial data communication bus, such as a controller area network (CAN) bus or a CAN with Flexible Data-Rate (CAN FD) bus. In the illustrated embodiment of FIG. 1A, the ECU 108 and the noncontact sensor 106 communicate via a CAN bus 107. The ECU 108 is configured to control movement of a powered door and take one or more automatic actions based on the data received from the noncontact sensor 106 (e.g., an integrated MCU), other vehicle data, data from the powered door itself, or a combination thereof. Data communicated between the ECU 108 and the noncontact sensor 106 may take various forms. In some embodiments, the data may include raw data detected by the noncontact sensor 106. In other embodiments, the data received by the ECU 108 may include data representing objects detected by the noncontact sensor 106. For example, in some embodiments, a DSP, a MCU, or both integrated with the noncontact sensor 106 may be configured to process data collected by the sensor to detect objects and data regarding the detected objects may be communicated to the ECU 108.

Figure 1C:
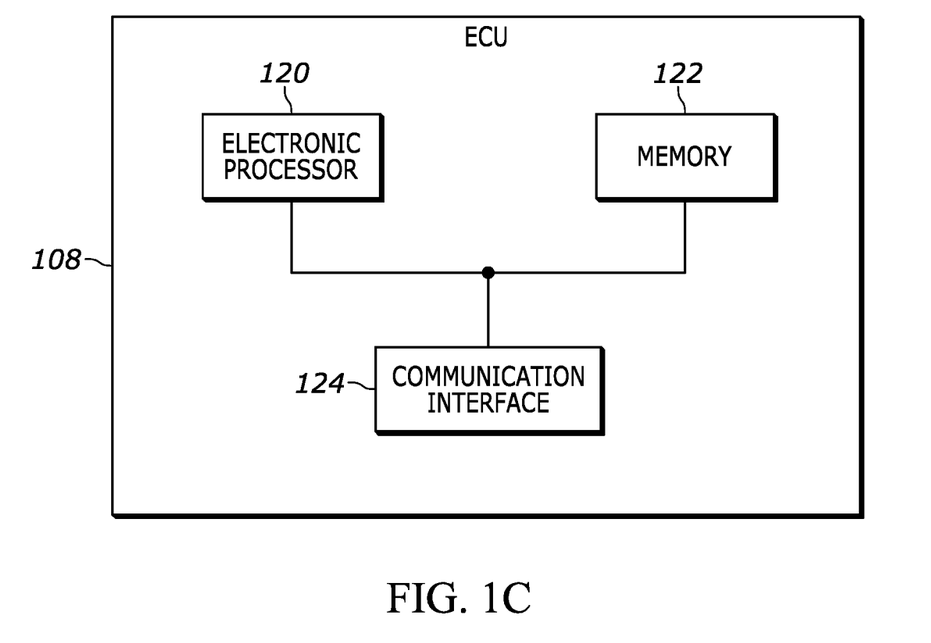
FIG. 1C is a schematic diagram illustrating the electronic control unit of the system of FIG. 1A according to one embodiment.

FIG. 1C is a block diagram schematically illustrating the ECU 108 in more detail. As illustrated in FIG. 1C, the ECU 108 includes an electronic processor 120 (for example, a microprocessor, application-specific integrated circuit (ASIC), or another suitable electronic device), a memory 122 (for example, a non-transitory, computer-readable storage medium), and a communication interface 124 for communicating over the communication bus 107 and, optionally, one or more additional communication networks or connections. For example, the communication interface 124 allows the ECU 108 to communicate with external components and networks, such as, for example, the CAN bus 107, for receiving data from the noncontact sensor 106.

The memory 122 includes non-transitory computer readable medium that may include a program storage area and a data storage area. The electronic processor 120 is coupled to the memory 122 and executes computer readable code ("software") stored within the memory 112, such as in a random access memory (RAM) of the memory (e.g., during execution) or a read only memory (ROM) of the memory (e.g., on a generally permanent basis), or another non-transitory computer readable medium included within the ECU 108 or external to the ECU 108. The software may include firmware, one or more applications, program data, filters, rules, one or more program modules, other executable instructions, or combinations thereof. The electronic processor 120 is configured to retrieve, from the memory 122, and execute, among other things, the software to perform a set of functions, including the processes and methods described herein.

It should be understood that the configuration of components included in the system 100 is one possible configuration. The functionality described herein can be performed using fewer or additional components. For example, in some embodiments, the noncontact sensor 106 (or components included in the noncontact sensor 106, such as a DSP, a MCU, or both) may be included in the ECU 108. Similarly, in some embodiments, the noncontact sensor 106 may be separate from an associated DSP, an associated MCU, or both and may communicate with these components wirelessly, over a wired connection, or a combination thereof. Furthermore, functionality described herein as being performed by the noncontact sensor 106 or the ECU 108 can be distributed over multiple processing units or controllers. In addition, in some embodiments, a separate noncontact sensor 106 and optionally a separate ECU 108 may be used for separate doors of the vehicle. Alternatively, a single ECU 108 may control multiple powered doors and may communicate with multiple noncontact sensors 106. Furthermore, in some embodiments, multiple noncontact sensors 106 may communicate with an ECU 108, such as to provide redundant or failsafe functionality.

Figure 2A:
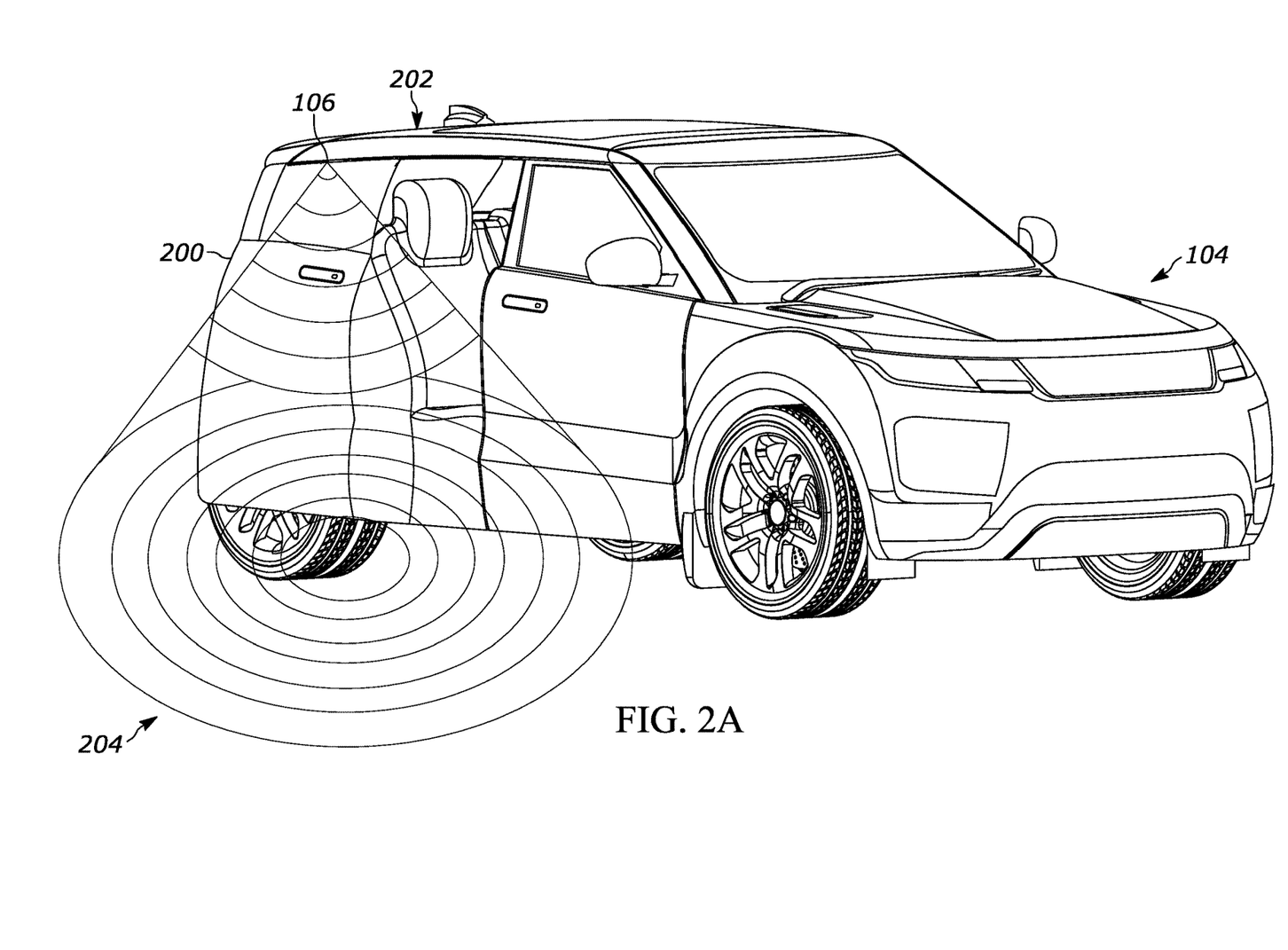
FIG. 2A illustrates a position of the sensor of FIG. 1A for a powered side sliding door according to one embodiment.
Figure 2B:
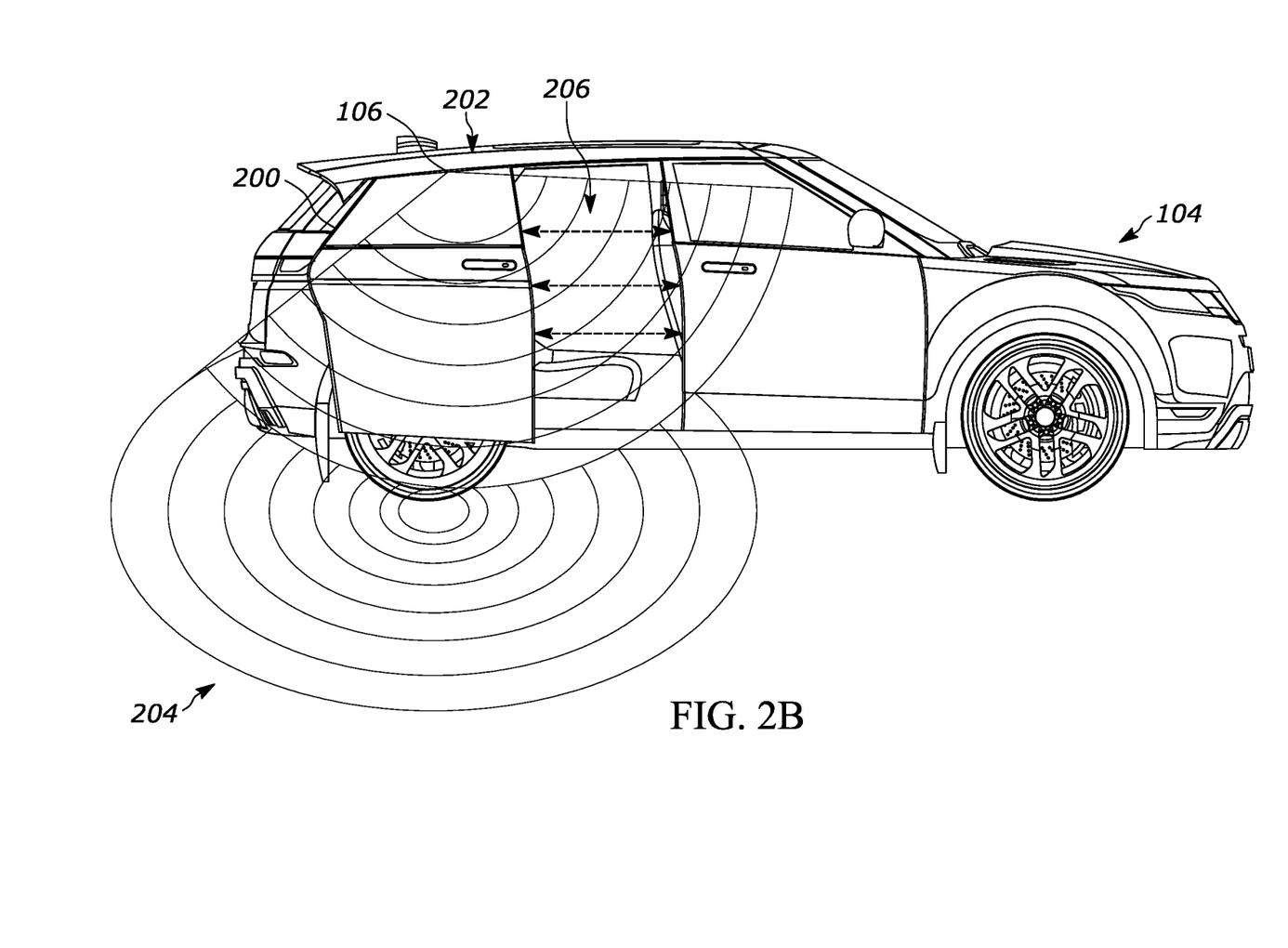
FIG. 2B illustrates a position of the sensor of FIG. 1A for a powered side sliding door according to one embodiment.

It should also be understood that the position of the components included in the system 100 are illustrated schematically in FIG. 1A. In particular, the noncontact sensor 106 may be positioned at various locations on the vehicle 104. For example, FIGS. 2A and 2B illustrate a position of the noncontact sensor 106 for a powered side siding door 200 according to one embodiment. In this embodiment, the noncontact sensor 106 is positioned at a top 202 of a sliding door 200 and, in particular, may be incorporated into a top frame or trim inward of the window of the sliding door 200. In some embodiments, the noncontact sensor 106 is positioned approximately centered along the top edge 202. As illustrated in FIGS. 2A and 2B, this position of the noncontact sensor 106 creates a field-of-view (FOV) 204 that includes at least a substantial portion of an object detection zone of the door 200. The object detection zone can include a motion path 206 of the door 200 and, optionally, a surrounding area of the motion path 206 (e.g., within the vehicle and exterior to the vehicle). For example, the object detection zone can include the motion path 206 of the door as well as an area extending in one or more directions or dimensions from the motion path 206. In particular, when the motion path 206 of the door is defined as a plane (e.g., spanning a height or other dimension of the powered door), the object detection zone can include the motion path 206 plane as well as an area extending above this plane, below this plane, to the side of the plane closer to the interior of the vehicle, to the side of the plane closer to the exterior of the vehicle, or a combination thereof. The size of this area may be the same in each direction, different in each direction, or vary between two or more directions.

The exact position of the noncontact sensor 106 on the frame will be tuned to maximize coverage of the FOV, especially the critical areas for obstacle detection, as well as vehicle packaging and styling. This position of the noncontact sensor 106 allows the noncontact sensor 106 to "see" the outside FOV while being protected from the environment inside the door 200. It should be understood that the noncontact sensor 106 and the ECU 108 may be constructed as a single unit or may be separate units. For example, due to size restrictions when mounting a sensor on a door frame, the ECU 108 may be a separate unit from the noncontact sensor 106 and mounted elsewhere in the vehicle 104.

Figure 3A:
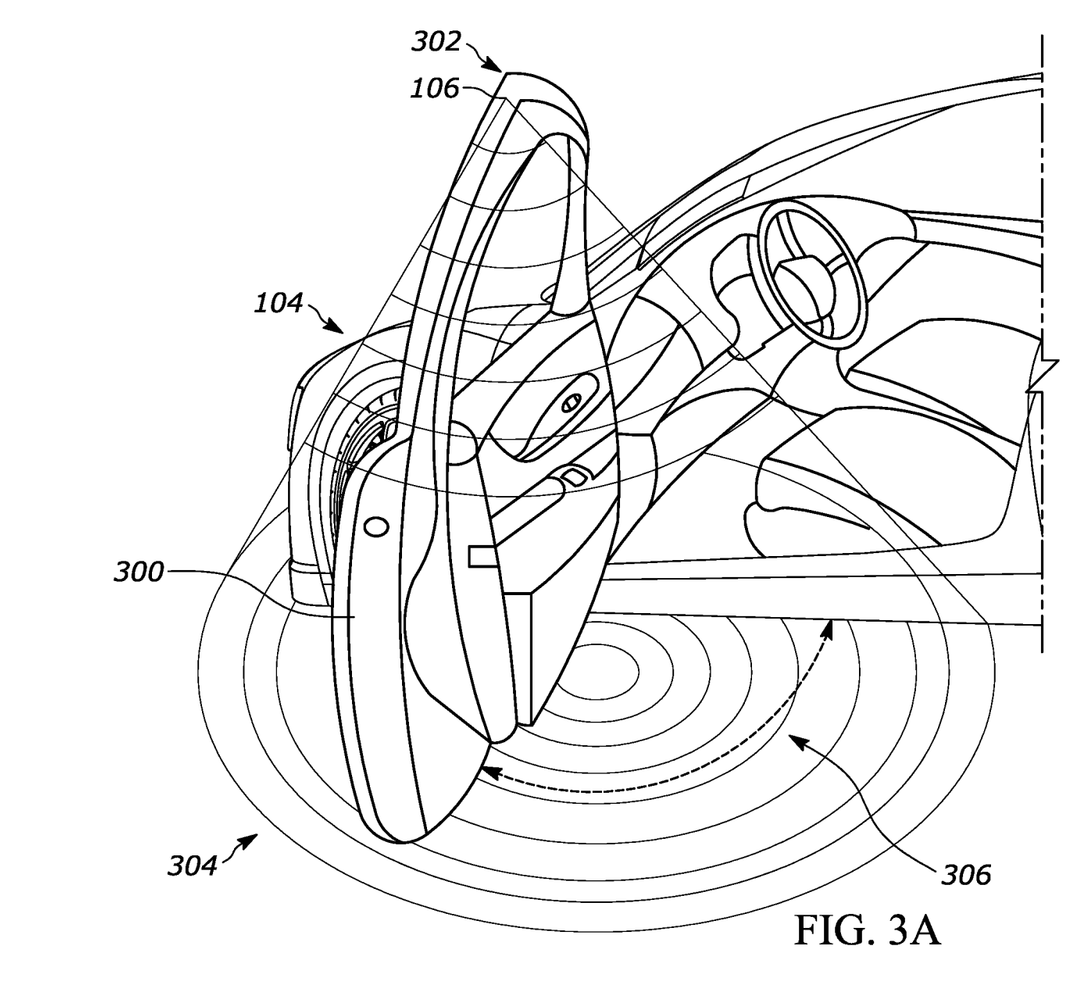
FIG. 3A illustrates a position of the sensor of FIG. 1A for a powered side swing door according to one embodiment.
Figure 3B:
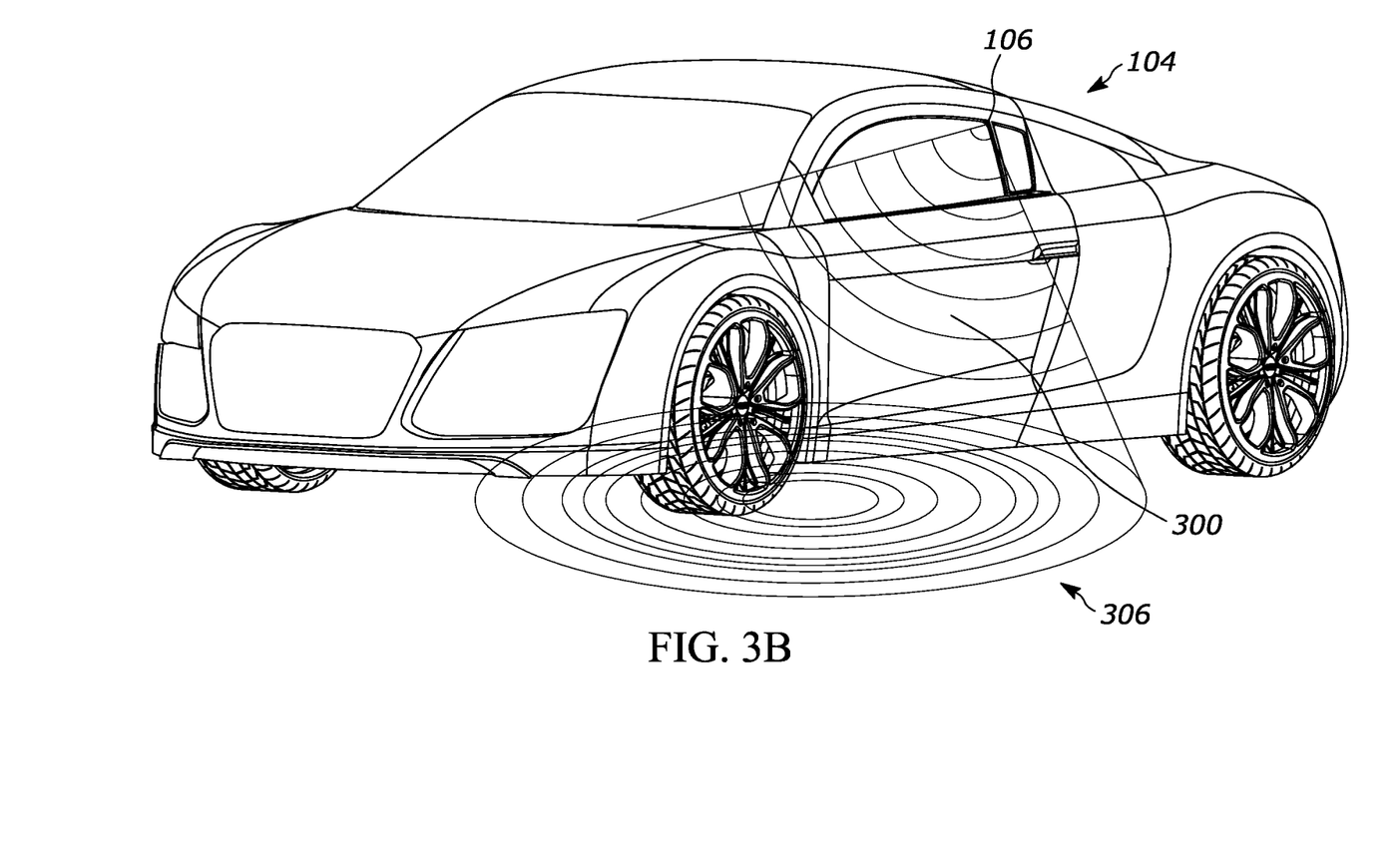
FIG. 3B illustrates a position of the sensor of FIG. 1A for a powered side swing door according to one embodiment.

Similarly, FIGS. 3A and 3B illustrate a position of the noncontact sensor 106 for a powered side swinging door 300 according to one embodiment. In this embodiment, the noncontact sensor 106 is positioned at a top, rear (with respect to a rear or back of the vehicle 104) edge 302 of the swinging door 300 and, in particular, may be incorporated into a top frame inward of the window in the swinging door 300, at a rear location or endpoint of the top frame. For example, when the door 300 is a front door of the vehicle 104, the noncontact sensor 106 may be positioned along a top edge 302 of the door 300 nearest to the B pillar of the vehicle 104 when the door 300 is closed. Similarly, when the door 300 is a rear door of the vehicle 104, the noncontact sensor 106 may be positioned along a top edge 302 of the door 300 nearest to the C pillar of the vehicle 104 when the door 300 is closed. As illustrated in FIGS. 3A and 3B, this position of the noncontact sensor 106 creates a field-of-view (FOV) 304 that includes at least a substantial portion of a motion path 306 of the door 300 as well as a surrounding area within and exterior to the vehicle 104.

Figure 4A:
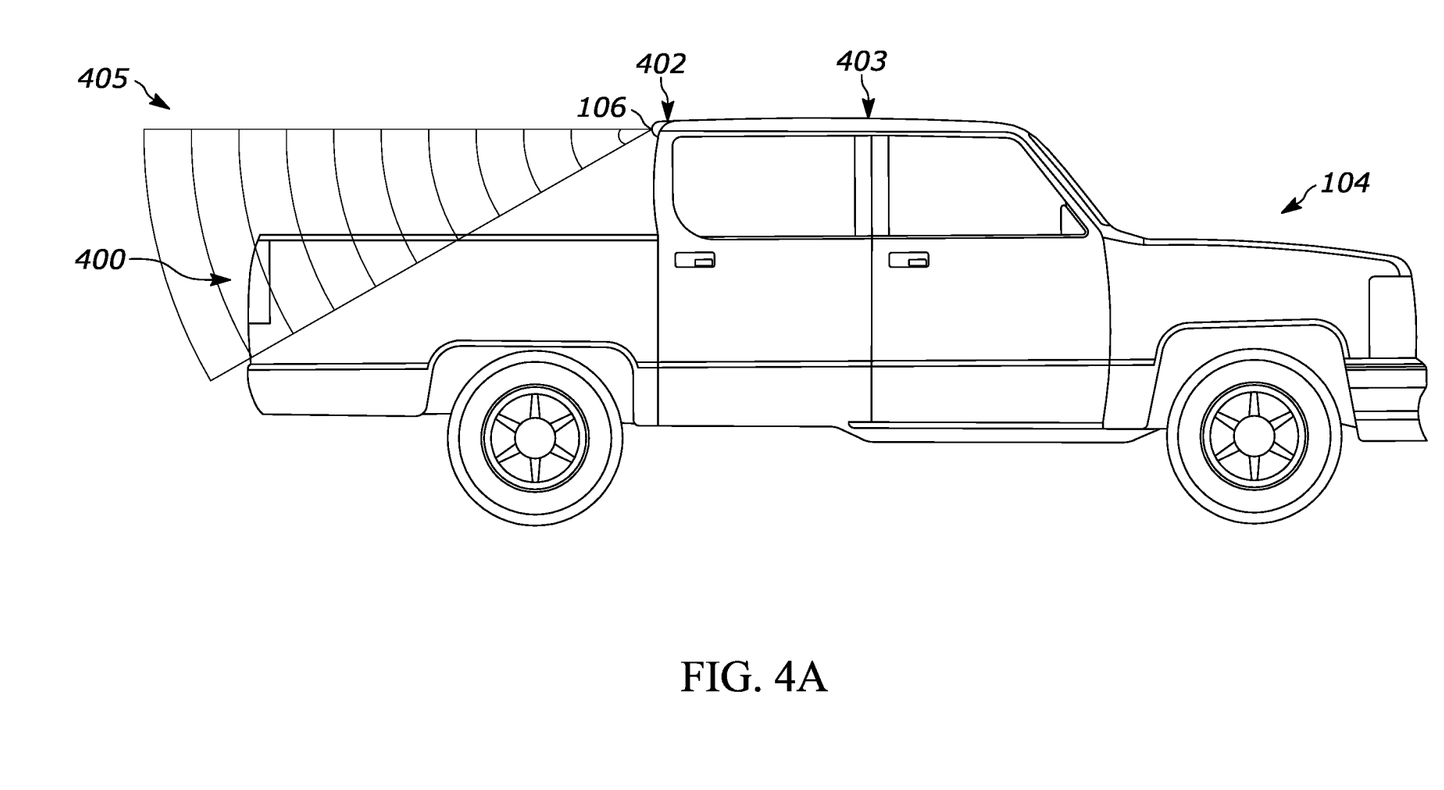
FIG. 4A illustrates a position of the sensor of FIG. 1A for a powered rear tailgate according to one embodiment.
Figure 4B:
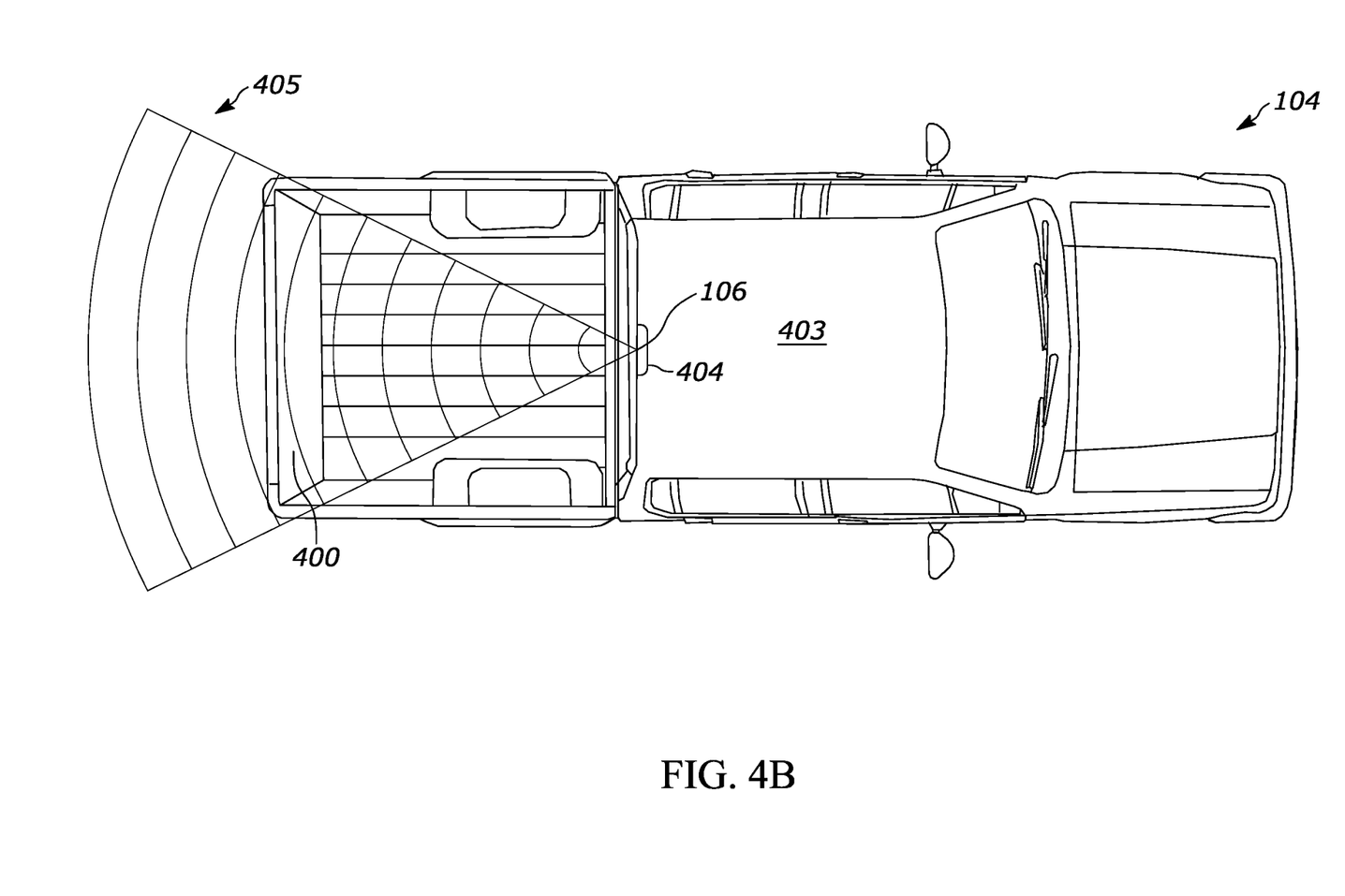
FIG. 4B illustrates a position of the sensor of FIG. 1A for a powered rear tailgate according to one embodiment.

FIGS. 4A and 4B illustrate a position of the noncontact sensor 106 for a powered rear tailgate 400 (for a pickup truck) according to one embodiment. In this embodiment, the noncontact sensor 106 is positioned at the top of a rear (with respect to a rear or back of the vehicle 104) exterior surface or edge 402 of a cab or passenger compartment 403 of the vehicle 104 and, in particular, may be incorporated into the frame around a brake light 404 positioned on the cab 403. Alternatively, the noncontact sensor 106 may be positioned inside the vehicle 104 behind a rear window of the cab 403.

As illustrated in FIGS. 4A and 4B, this position of the noncontact sensor 106 creates a field-of-view (FOV) 405 that includes at least a substantial portion of a motion path (not shown) of the tailgate 400 as well as a surrounding area within (within a truck bed) and exterior to the vehicle 104. In this embodiment, the FOV of the sensor position enables detection of a person in proximity to the tailgate as well as a heavy load propped up on the closed tailgate itself (e.g., long lumber, metal pipes, and the like).

Figure 5A:
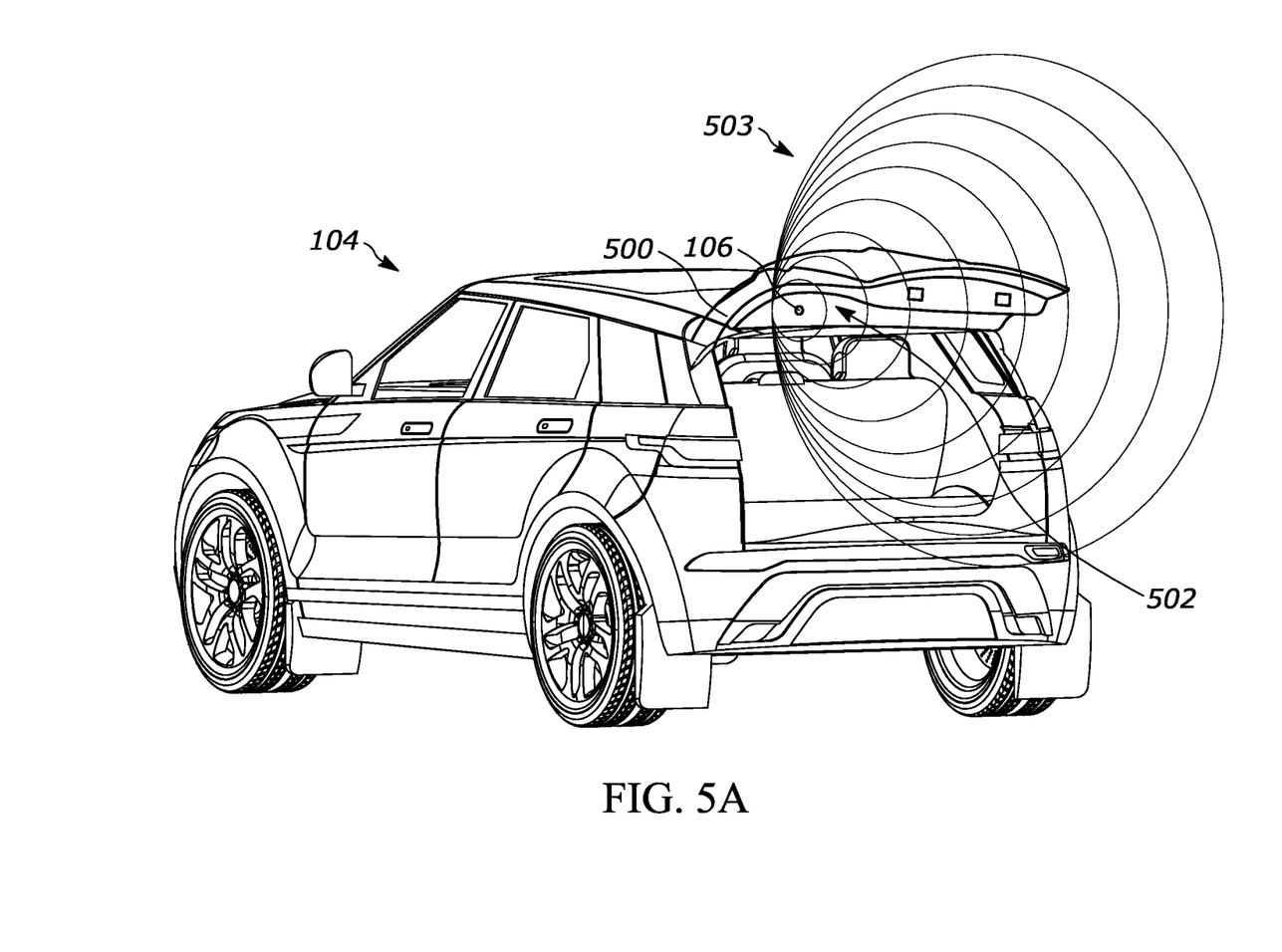
FIG. 5A illustrates a position of the sensor of FIG. 1A for a powered rear liftgate according to one embodiment.
Figure 5B:
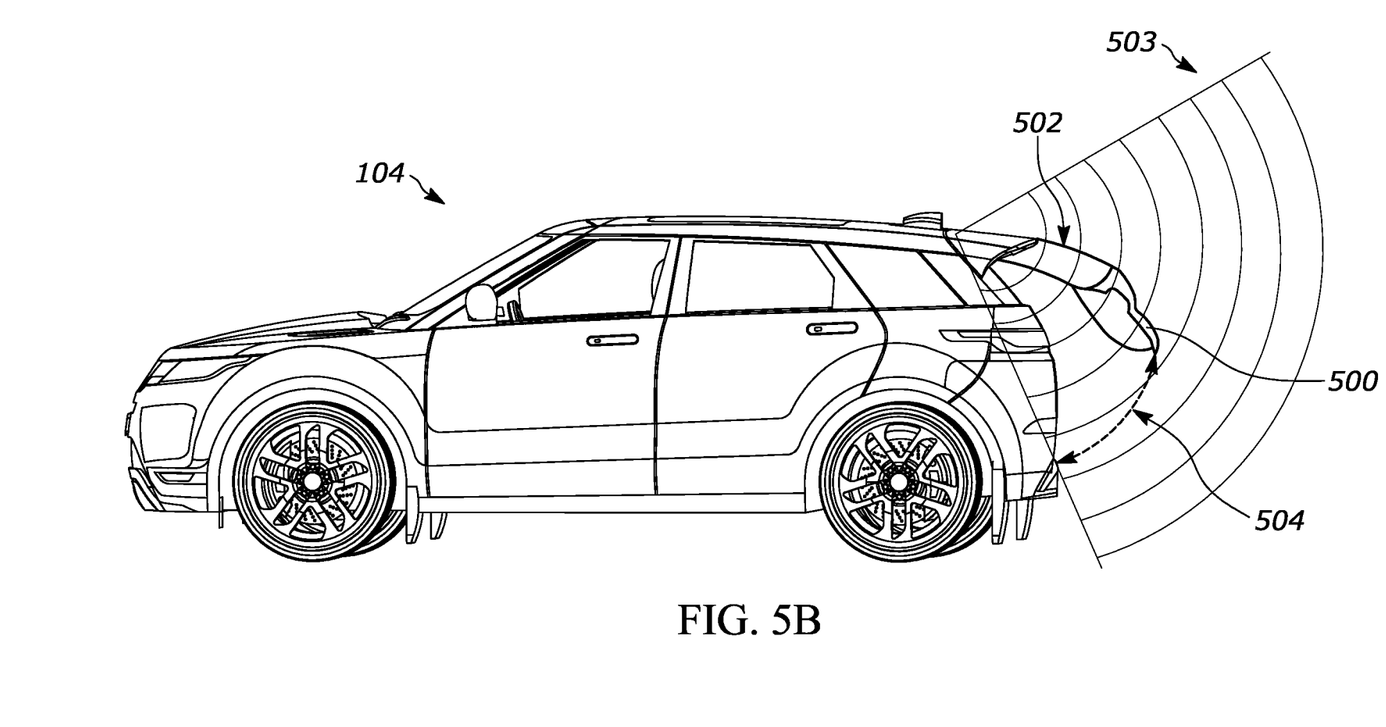
FIG. 5B illustrates a position of the sensor of FIG. 1A for a powered rear liftgate according to one embodiment.

FIGS. 5A and 5B illustrate a position of the noncontact sensor 106 for a powered rear liftgate 500 according to one embodiment. In this embodiment, the noncontact sensor 106 is positioned within an interior surface of the liftgate 500 at the top of the liftgate 500 (e.g., where the liftgate 500 is closest to the vehicle 104 in an open position). In some embodiments, the noncontact sensor 106 may be incorporated within a top frame or trim inward of the window 502 included in the liftgate 500. As illustrated in FIGS. 5A and 5B, this position of the noncontact sensor 106 creates a field-of-view (FOV) 503 that includes at least a substantial portion of a motion path 504 of the liftgate 500 as well as a surrounding area within and exterior to the vehicle 104 including, for example, the D pillar areas.

It should be understood that a vehicle 104 can include more than one powered door and, thus, may include multiple noncontact sensors 106 per the illustrated configurations in FIGS. 2A, 2B, 3A, 3B, 4A, 4B, 5A, and 5B in various combinations. For example, in some embodiments, a vehicle 104 may include two powered side swings doors 300 as well as one or two powered side slide doors 200. Similarly, in some embodiments, a vehicle 104 may include two or more powered side swinging doors 300 as well as a powered tailgate 400 or liftgate 500. Accordingly, if an obstacle detection system is installed for one or more doors on a vehicle 104, multiple noncontact sensors 106 may be positioned on the vehicle. In some embodiments, depending on the positioning of a particular noncontact sensors, one or more noncontact sensors can be contained within a single housing or packaging. In some embodiments, each noncontact sensor 106 may be configured to communicate with a dedicated ECU 108 as described above. However, in other embodiments, one ECU 108 may be configured to communicate and receive data from multiple noncontact sensors 106.

The noncontact sensor 106 in each of the above embodiments is specifically positioned on the vehicle 104 to provide broad coverage and accurately detect potential obstacles. For example, the specific positions of the noncontact sensors 106 illustrated in FIGS. 2A, 2B, 3A, 3B, 4A, 4B, 5A and 5B allow, in some embodiments, a single sensor to be used to perform obstacle detection, which is less costly and less complex than using sensor arrays to ensure that an obstacle detection system has an appropriate FOV. Similar cost and FOV issues also exist for camera-based systems. As used in the present application, a noncontact sensor 106 has a FOV that includes at least a "substantial portion" of a motion path of a vehicle or a corresponding object detection zone when the FOV includes at least 80% of the motion path or the corresponding object detection zone.

Furthermore, in some embodiments, each noncontact sensor 106 is pre-programmed and calibrated for a particular powered door system based on characteristics or parameters of the powered door system, such as, for example, one or more dimensions of the powered door, a FOV reference point or location on the vehicle body or door, or a combination thereof. These characteristics can be taken into account by the DSP 112, the MCU 114, or both as part of processing the collected sensor data for communication to the ECU 108, which can improve the quality of information provided to the ECU 108, provide the ECU 108 with needed relevant information, or a combination thereof. For example, depending on the location of the noncontact sensor 106, the noncontact sensor 106 can be calibrated to distinguish between the door, the vehicle body, and other vehicle components from other physical objects within the sensor's FOV that may be potential obstacles.

Figure 6:
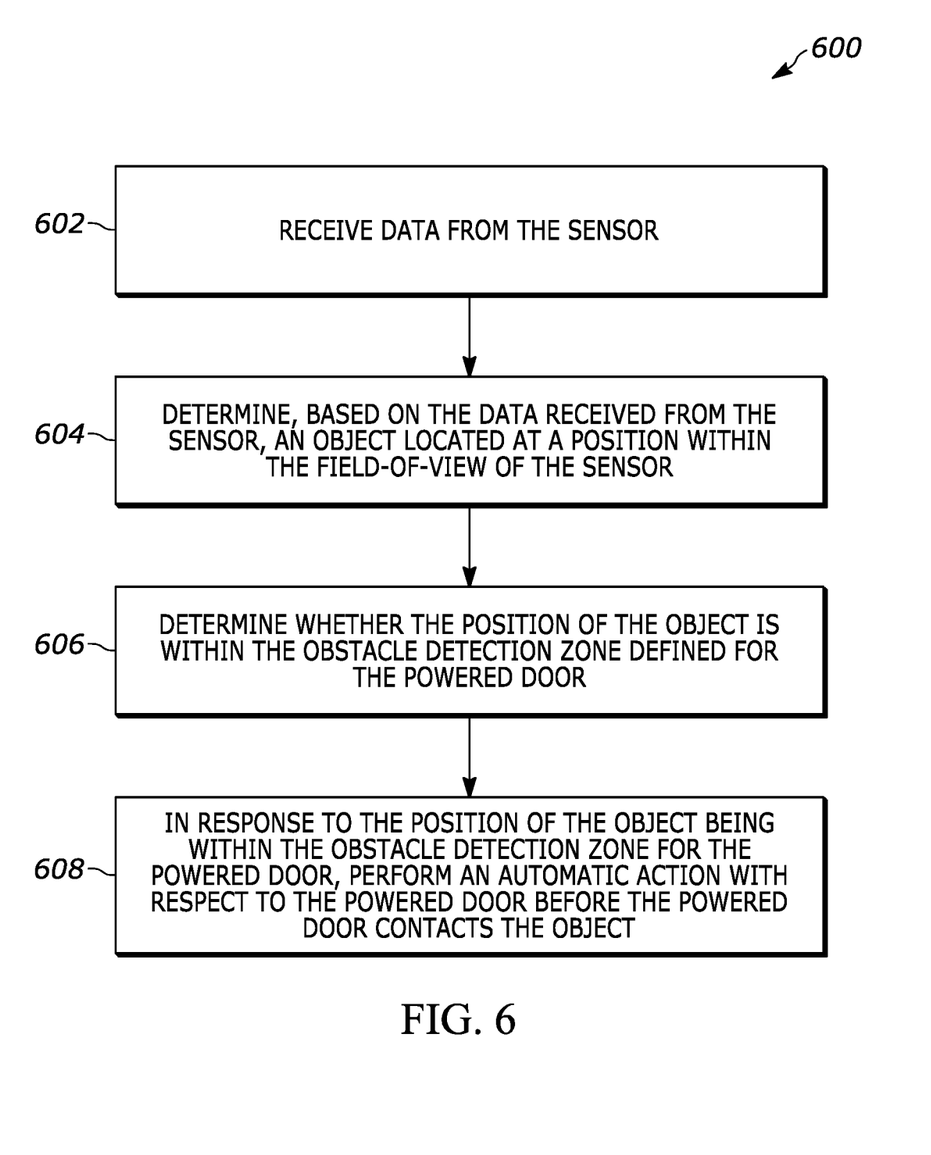
FIG. 6 is a flowchart illustrating a method of detecting a potential obstacle implemented by the system of FIG. 1A according to one embodiment.

FIG. 6 illustrates a method 600, implemented by the ECU 108 (for example, via the electronic processor 120) for preventing a powered vehicle door from making contact with an object. At block 602, the ECU 108 receives data from the noncontact sensor 106. In some embodiments, the noncontact sensor 106 transmits processed data to the ECU 108 in the form of message, such as CAN messages. Each message can include from 8 bytes to 64 bytes of data. In some embodiments, the data communicated to the ECU 108 includes displacement data for detected objects, such as displacement data in one or more dimensions (e.g., x, y, and z displacements) from the noncontact sensor 106. In some embodiments, the data communicated to the ECU 108 also includes a number of objects detected by the noncontact sensor 106 within the sensor's FOV. The ECU 108 can receive object data (CAN messages) from the noncontact sensor 106 at a predetermined frequency, such as every 100 milliseconds.

At block 604, the ECU 108 determines, based on the data received from the noncontact sensor 106, an object located at a position within the field-of-view (which includes an obstacle detection zone) of the noncontact sensor 106. In particular, the ECU 108 is configured to process the data received from the noncontact sensor 106 including the data associated with each object detected by the noncontact sensor 106 to determine (block 606) whether there is an object within the obstacle detection zone defined for the powered door. As noted above, the obstacle detection zone can be defined around at least a portion of a powered door (e.g., the motion path of the powered door) in various dimension or directions (such as, for example, in both a vertical dimension and a horizontal dimension). Defining such a zone, allows a potential obstacle to be detected if it is close to the motion path of the powered door but not yet directly within the motion path and may even allow the systems and methods described herein to track the velocity of detected objects and use this velocity to detect when a potential obstacle is stationary, moving toward a motion path, or moving away from a motion path (and at what speed, trajectory, or the like). It should be understood that as used in the present application, a "potential obstacle" may include an inanimate object or a living object or a portion thereof.

At block 608, the ECU 108, in response to the position of the object being within the obstacle detection zone for the powered door, performs an automatic action with respect to the powered door before the powered door contacts the object. In particular, when a detected object is within the obstacle detection zone, the object is a potential obstacle and the ECU 108 can be configured to perform one or more automatic actions. In some embodiments, the ECU 108 can be configured to perform different automatic actions based on the current state and intended function of the powered door system and on various characteristics of the detected object including, for example, size, shape, distance from the door or portion or size of the object detected within the obstacle detection zone, velocity, object classification (e.g., human vs. inanimate object) or a combination thereof. For example, when a large object is detected within the obstacle detection zone, the ECU 108 may be configured to take a more evasive automatic action as compared to when a smaller object is detected. Similarly, the ECU 108 may take a different automatic action depending on whether a detected object is stationary or moving or whether the detected object is moving toward the door or away from the door. Detected objects that are not located within the obstacle detection zone can be discarded by the ECU 108. However, in some embodiments, the ECU 108 may be configured track even discarded detected objects over time to assess whether an object is moving toward the door and, thus, whether any automatic actions are needed.

Also, a potential obstacle may be a part of an object just outside of the obstacle detection zone. For example, the obstacle may be an appendage within the obstacle detection zone of a person standing just outside of the obstacle detection zone (for example, a hand, finger, foot, and the like). The ECU 108 may then perform an automatic action accordingly. For example, for the power tailgate 400, when a person is detected near the motion path of the tailgate 400, the ECU 108 may be programmed to not allow a power close until the person is far enough away that they could not possibly reach into the motion path. In some embodiments, a detected object may be ignored depending on the operation of the door (e.g., obstacles on the outside of the door may be ignored when the door is closing). Accordingly, in some embodiments, the ECU 108 may store (e.g., in internal memory or elsewhere) expected objects that will be detected (e.g., vehicle), obstacle detection zones depending on door position, previously-detected objects and use the stored information as part of processing subsequently-detected objects.

The obstacle detection zone used by the ECU 108 may be calibrated for a given powered door system. For example, different obstacle detection zones may be defined for side swing doors, side slide doors, rear liftgates, and rear tailgates. Different obstacle detection zones may also be defined for different types of vehicles, different locations of sensors, as well as one or more different geometric or operational characteristics of the powered door (for example, size of the powered door, length of motion path, speed of motion, or the like). Also, in some embodiments, the obstacle detection zones may change dynamically over the travel path of the door. The obstacle detection zone can be defined in any shape to accommodate and represent areas where obstacles are likely or areas where damage may be extensive to ensure that the ECU 108 properly detects and reacts to detected objects. Also, in some embodiments, an obstacle detection zone has a minimum and maximum two-dimensional (vertical and horizontal) range with fixed height (z), and the ECU 108 may be configured to dynamically change the obstacle detection zone within minimum and maximum plane based on the position of the during movement. For example, as the door gets closer to closing the obstacle detection zone may be condensed to account for the fact that there is a smaller area for physical objects to enter the motion path of the door, which reduces processing requirements as more objects detected by the noncontact sensor 106 may be discarded by the ECU 108. Similarly, in some embodiments, the ECU 108 can be configured to ignore all data received from the noncontact sensor 106 when the powered door is within a predetermined threshold (for example, approximately 6 to 10 millimeters) of reaching a fully closed position during a power close operation of the door (for example, to prevent a false reversal).

Although the above embodiments provide examples of powered door systems for vehicles, the obstacle detection systems and methods described herein are equally applicable for doors on buildings. Also, the sensors and associated functionality described above for powered door systems may be used to detect a human gesture, such as a hand waving, which may be used to initiate one or more vehicle functions, such as, for example, power opening of a door. For example, in some embodiments, the ECU 108 is configured to detect a human gesture and perform an operation of the powered door system based on the detected human gesture.

Various features and advantages of some embodiments are set forth in the following claims.

What is claimed is:

1. A powered door system comprising:
an electronic control unit; and
a noncontact sensor, the noncontact sensor having a field-of-view substantially including an obstacle detection zone defined for a powered door;
the electronic control unit is configured to:
receive data from the noncontact sensor,
determine, based on the data received from the noncontact sensor, an object located at a position within the field-of-view of the noncontact sensor,
determine whether the position of the object is within the obstacle detection zone defined for the powered door, and
in response to the position of the object being within the obstacle detection zone for the powered door, perform an automatic action with respect to the powered door before the powered door contacts the object,
wherein the noncontact sensor is positioned inward of a window of a vehicle including the powered door and wherein the field-of-view is through the window.

2. The powered door system of claim 1, wherein the noncontact sensor includes a millimeter wave radar sensor.

3. The powered door system of claim 1, wherein the electronic control unit communicates with the noncontact sensor over a serial data communication bus.

4. The powered door system of claim 1, wherein the powered door includes a sliding door of the vehicle, wherein the window includes a window surface of the sliding door, and wherein the noncontact sensor is positioned on at a top frame or trim inward of the window surface of the sliding door.

5. The powered system of claim 1, wherein the powered door includes a swinging door of the vehicle, wherein the window includes a window of the swinging door, and wherein the noncontact sensor is positioned at a top rear edge inward of the window of the swinging door.

6. The powered door system of claim 1, wherein the powered door includes a tailgate of the vehicle pickup truck, wherein the window is a rear window of a cab of the vehicle, and wherein the noncontact sensor is positioned inside the vehicle behind the rear window of the cab.

7. The powered door system of claim 1, wherein the automatic action includes at least one selected from a group consisting of issuing an alarm, stopping movement of the powered door, slowing movement of the powered door, and reversing movement of the powered door.

8. The powered door system of claim 1, wherein the electronic control unit is further configured to dynamically change the obstacle detection zone based on the position of the powered door during movement.

9. The powered door system of claim 1, wherein the electronic control unit is further configured to ignore the data received the noncontact sensor when the powered door is within a predetermined threshold of reaching a fully closed position during a power close operation.

10. The powered door system of claim 1, wherein the electronic control unit is further configured to detect a human gesture and operate the powered door based on the human gesture.

11. A method of detecting a potential obstacle for a powered door system, the method comprising:
receiving data from a noncontact sensor, the noncontact sensor having a field-of-view substantially including an obstacle detection zone defined for a powered door;
determining, based on the data received from the noncontact sensor, an object located at a position within the field-of-view of the noncontact sensor,
determining whether the position of the object is within the obstacle detection zone defined for the powered door, and
in response to the position of the object being within the obstacle detection zone for the powered door, performing an automatic action with respect to the powered door before the powered door contacts the object, wherein
the powered door includes a tailgate of a vehicle, and
wherein the noncontact sensor is positioned on a rear exterior surface of a cab of the vehicle.

12. The method of claim 11, wherein the noncontact sensor includes a millimeter wave radar sensor.

13. The method of claim 11, wherein the automatic action includes at least one selected from a group consisting of issuing an alarm, stopping movement of the powered door, slowing movement of the powered door, and reversing movement of the powered door.

14. The method of claim 11, the method further including dynamically changing the obstacle detection zone based on the position of the powered door during movement.

15. A powered door device comprising:
an electronic control unit, the electronic control unit is configured to:
receive data from a noncontact sensor having a field-of-view substantially including an obstacle detection zone defined for a powered door,
determine, based on the data received from the noncontact sensor, an object located at a position within the field-of-view of the noncontact sensor,
determine whether the position of the object is within the obstacle detection zone defined for the powered door, and
in response to the position of the object being within the obstacle detection zone for the powered door, perform an automatic action with respect to the powered door before the powered door contacts the object,
wherein the powered door includes a liftgate of a vehicle and wherein the noncontact sensor is positioned on a top frame or trim interior surface of the liftgate.

16. The powered door device of claim 15, wherein the noncontact sensor includes a millimeter wave radar sensor.

17. The powered door system of claim 15, wherein the electronic control unit communicates with the noncontact sensor over a serial data communication bus.

18. The powered door system of claim 15, wherein the automatic action includes at least one selected from a group consisting of issuing an alarm, stopping movement of the powered door, slowing movement of the powered door, and reversing movement of the powered door.

19. The powered door system of claim 15, wherein the electronic control unit is further configured to dynamically change the obstacle detection zone based on the position of the powered door during movement.

20. The powered door system of claim 15, wherein the electronic control unit is further configured to ignore the data received the noncontact sensor when the powered door is within a predetermined threshold of reaching a fully closed position during a power close operation.

* * * * *